(12) United States Patent
Ge

(10) Patent No.: US 8,290,520 B2
(45) Date of Patent: Oct. 16, 2012

(54) MOBILE PHONE WITH FUNCTION TO ACQUIRE TARGETED MESSAGE AND METHOD THEREOF

(75) Inventor: Chi-Sheng Ge, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/095,933

(22) Filed: Apr. 28, 2011

(65) Prior Publication Data

US 2012/0172030 A1 Jul. 5, 2012

(30) Foreign Application Priority Data

Dec. 29, 2010 (TW) .............................. 99146727 A

(51) Int. Cl.
*H04W 4/00* (2009.01)

(52) U.S. Cl. ..................................... 455/466; 455/414.1

(58) Field of Classification Search .................. 455/405, 455/414.1, 466, 414.2, 414.3, 456.1, 456.2, 455/456.3

See application file for complete search history.

(56) References Cited

U.S. PATENT DOCUMENTS

| 7,801,518 | B1* | 9/2010 | Urbanek | 455/423 |
| 7,930,208 | B2* | 4/2011 | Sharman et al. | 705/14.53 |
| 2005/0159145 | A1* | 7/2005 | Urakawa et al. | 455/418 |
| 2007/0198339 | A1* | 8/2007 | Shen et al. | 705/14 |
| 2008/0032719 | A1* | 2/2008 | Rosenberg | 455/466 |
| 2009/0011781 | A1* | 1/2009 | Merrill et al. | 455/466 |
| 2011/0015926 | A1* | 1/2011 | Kim | 704/235 |
| 2012/0030025 | A1* | 2/2012 | Pan | 705/14.66 |

* cited by examiner

*Primary Examiner* — Meless N Zewdu
*Assistant Examiner* — Michael S Bush
(74) *Attorney, Agent, or Firm* — Altis Law Group, Inc.

(57) ABSTRACT

The disclosure provides a mobile phone with function to acquire targeted message and method thereof. The method includes steps: recording sub-actions of the mobile phone in response to input signals from a user in a predetermined time period in a coverage area of the base station, acquiring a defined key phrase of each sub-action and grouping all sub-actions associated with a same key phrase into a same action, counting the number of times of the action is performed in the predetermined time period in the coverage area of the base station, judging whether the number of times of the action reaches a preset value, if yes, sending a wireless signal including the key phrase of the action to the base station, and receiving a message including the key phrase within the text body of the message from the base station and displaying the message.

2 Claims, 4 Drawing Sheets

| Position of the mobile phone | Action | Key phrase | Times |
|---|---|---|---|
| Shenzhen | Shopping on the Internet | web shop | 18 |
| Shenzhen | Searching for information about scenic spots on the Internet | web map | 26 |
| Shenzhen | Playing a game | game | 8 |
| ... | ... | ... | ... |
| Beijing | Playing a game | game | 30 |
| Beijing | Browsing photos | photo | 16 |
| Beijing | Shopping on the Internet | web shop | 5 |
| ... | ... | ... | ... |
| ... | ... | ... | ... |

FIG. 3

MOBILE PHONE WITH FUNCTION TO ACQUIRE TARGETED MESSAGE AND METHOD THEREOF

BACKGROUND

1. Technical Field

The disclosure relates to a mobile phone and, more particularly, to a mobile phone able to acquire targeted messages according to use characteristics and message acquisition method adapted for the mobile phone.

2. Description of Related Art

Mobile phone users often receive a lot of unwanted short-messages and advertisements. A spam manager to filter the junk short-messages and advertisements may be used. However, the spam manager may filter out wanted messages from favored service providers.

Therefore, what is needed is a mobile phone to overcome the described shortcoming.

BRIEF DESCRIPTION OF THE DRAWINGS

FIG. 3 is a schematic diagram of a list of actions of the mobile phone of FIG. 1.

DETAILED DESCRIPTION

Figure 1:
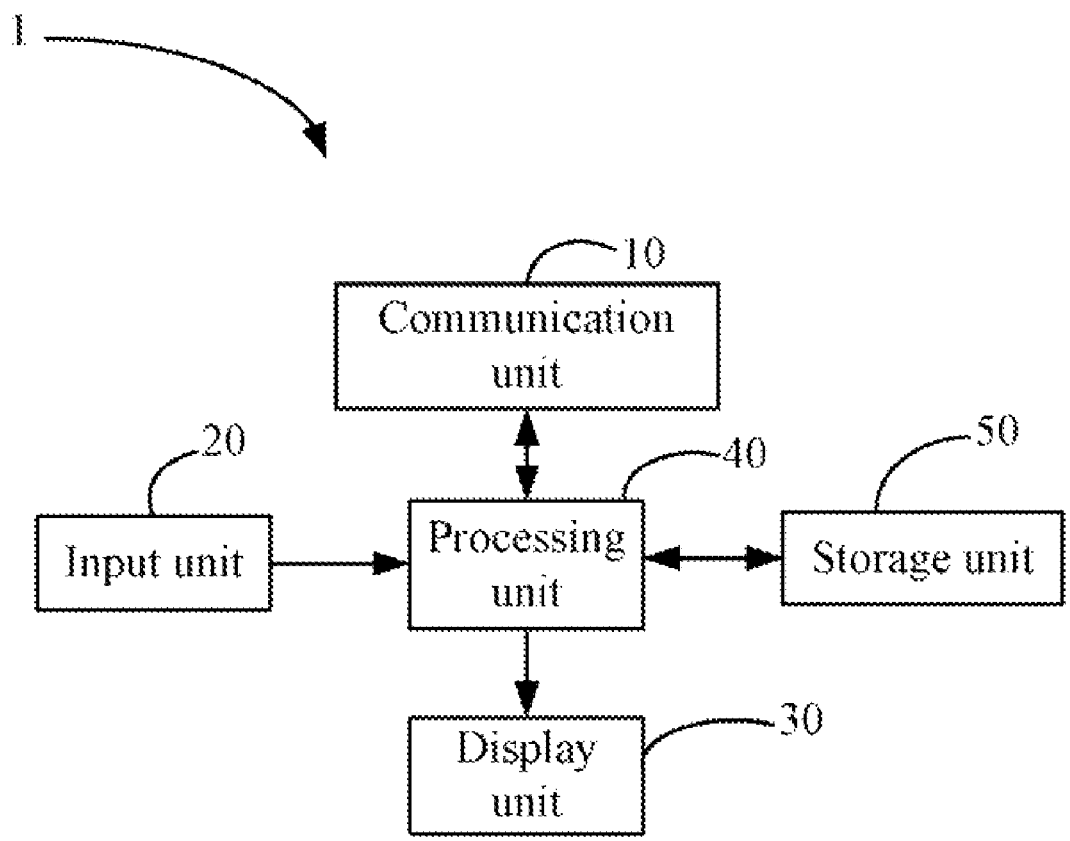
FIG. 1 is a block diagram of a mobile phone with targeted message acquisition function in accordance with an exemplary embodiment.

FIG. 1 is a block diagram of a mobile phone 1 with targeted message acquisition function in accordance with an exemplary embodiment. The mobile phone 1 includes a communication unit 10, an input unit 20, a display unit 30, a processing unit 40, and a storage unit 50. When the mobile phone 1 is in a coverage area of a base station, the mobile phone 1 communicates with the base station.

The communication unit 10 is configured for communicating with a base station, for example, by sending a wireless signal to the base station and receiving a wireless signal from the base station. The input unit 20 is configured for generating input signals in response to user input. The display unit 30 is configured for displaying information. The processing unit 40 is configured for controlling the mobile phone 1 to perform all functions in response to input signals from the input unit 20 and controlling the communication unit 10 to communicate with the base station.

Figure 2:
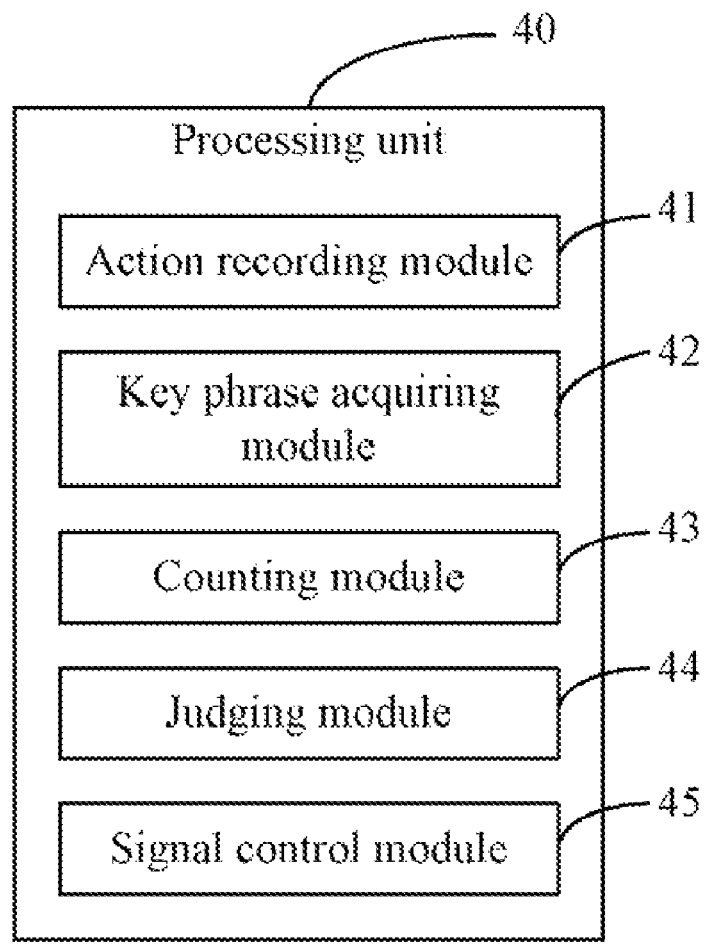
FIG. 2 is a block diagram of a processing unit of the mobile phone of FIG. 1.

As shown in FIG. 2, the processing unit 40 includes an action recording module 41, a key phrase acquiring module 42, a counting module 43, a judging module 44, and a signal control module 45. The action recording module 41 is configured for recording all sub-actions of the mobile phone 1 corresponding to input signals from the input unit 20 in a coverage area. For example, when the mobile phone 1 is in Shenzhen, the action recording module 41 records the sub-actions which include shopping on the Internet using the mobile phone 1, searching for information about scenic spots on the Internet using the mobile phone 1, and playing games using the mobile phone 1, etc. The mobile phone 1 defines a number of key phrases, such as the key phrases "web shop", "game", and "photo" in FIG. 3.

The key phrase acquiring module 42 is configured for acquiring a defined key phrase with each sub-action and grouping all sub-actions associated with a same key phrase into a same action. As shown in FIG. 3, the key phrase for the action of shopping on the Internet is "web shop" and the key phrase for the action of playing a game is "game." Even though some sub-actions may be not exactly the same they can still be associated with the same key phrase. For example, a user may play different games on the mobile phone 1 but all the games would be associated with the key phrase "game" and the sub-actions of playing different games are grouped into a same action. The counting module 43 is configured for counting the number of times of the action is performed in a predetermined time period in a coverage area of a base station and forming a list of actions.

The storage unit 50 is configured for storing the list. As shown in FIG. 3, the list records relationships among positions of the mobile phone, actions, key phrases, and the number of times each action has been performed. The list includes a column of position of the mobile phone, an action column, a key phrase column, and a times column.

The column of position of the mobile phone 1 records the position where each action takes place, such as Shenzhen, Beijing. When the mobile phone 1 is in Shenzhen, a base station in Shenzhen communicates with the mobile phone 1 and the mobile phone 1 is in the coverage area of the Shenzhen base station, and when the mobile phone 1 is in Beijing, a base station in Beijing communicates with the mobile phone 1 and the mobile phone 1 is in the coverage area of the Beijing base station. The action column records all actions, such as playing a game and browsing photos.

The key phrase column records a key phrase for each action, for example, the key phrase associated with the playing a game is "game." The times column records the number of times each action is performed in the predetermined time period in the coverage area of the base station, for example, the number of times the mobile phone 1 is used for shopping on the Internet is 18 in one week when the mobile phone 1 is in Shenzhen and the number of times games were played on the mobile phone 1 is 30 in one week when the mobile phone 1 is in Beijing.

The judging module 44 is configured for judging whether the number of times of an action reaches a preset value in the predetermined time period in the coverage area of the base station, wherein the preset value represents the number of times an action should be performed in a given time period to be considered a habit of the mobile phone user in the coverage area. When the number of times an action is performed reaches the preset value in the predetermined time period in the coverage area of a base station, the signal control module 45 is configured for controlling the communication unit 10 to send a wireless signal including the key phrase for the action to the base station, receive messages which include the key phrase within the text bodies of the messages from the base station, and controlling the display unit 30 to display the messages. Therefore, when the mobile phone 1 is in the coverage area of a base station, the mobile phone user may receive messages from the base station according to their habits and those advertising messages without the key phrases would not be received.

When the mobile phone 1 returns to the coverage area of the base station, the processing unit 40 is further configured for controlling the communication unit 10 to send a wireless signal including the key phrase for an action performed a number of times equal to or greater than the preset value and receive messages including the key phrases from the base station. For example, it may be predetermined that when the mobile phone 1 enters an area covered by a base station, which signifies the person has either been away and is returning or is a new visitor and the preset value is 1.

Therefore, when for example, the mobile phone 1 returns to Shenzhen from Beijing, the processing unit 40 controls the communication unit 10 to send a wireless signal including the key phrase "web map" to the base station in Shenzhen and receives messages including the key phrase "web map" from the base station, such messages could contain maps and directions for places of interest in Shenzhen Other key phrases may be sent as well, for example, if played games while traveling to Shenzhen and reached the preset value for action of playing games. Therefore, messages containing the key phrase "game" could be received, such messages could include advertising for new games or accessing to online games or other gaming news.

Figure 4:
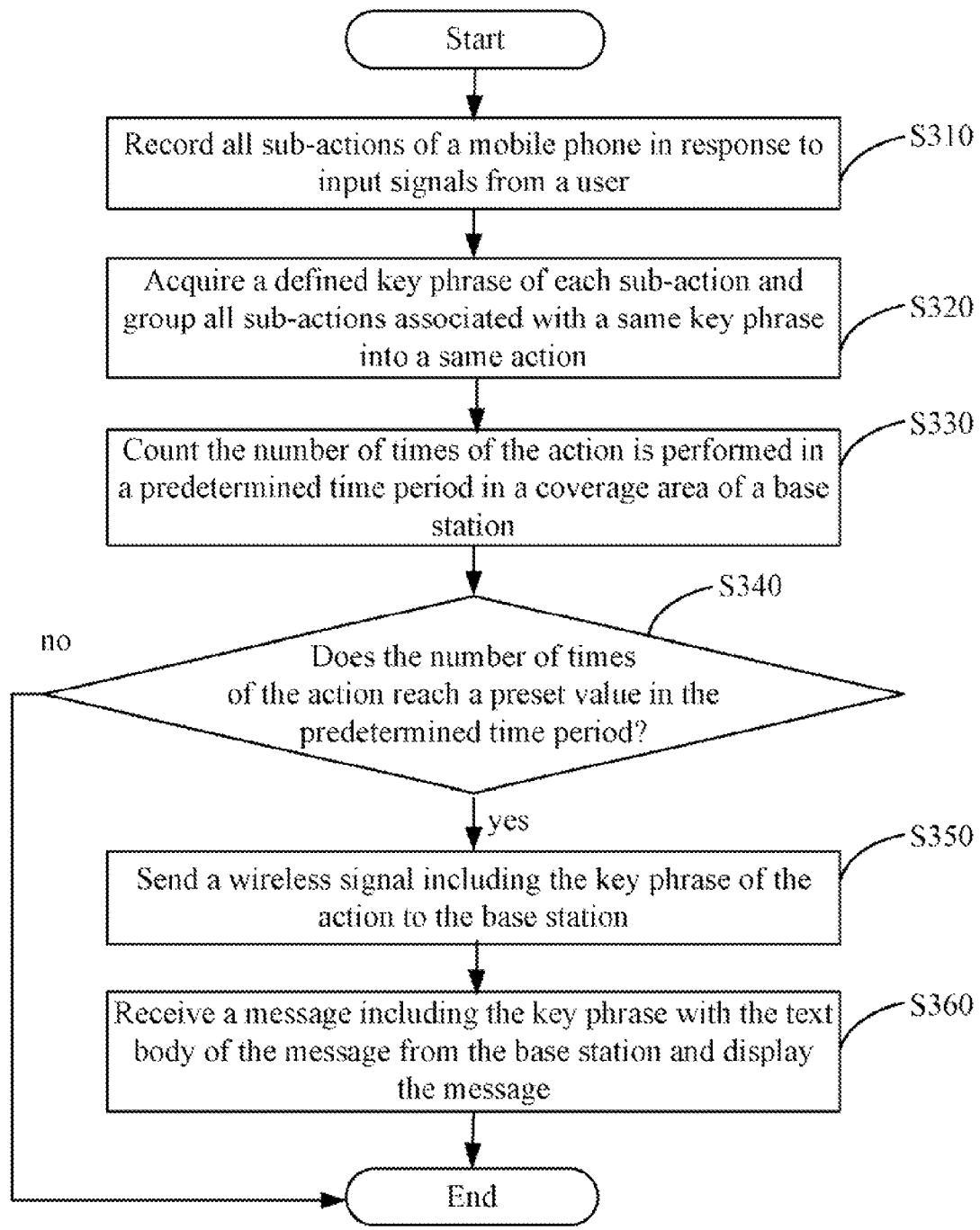
FIG. 4 is a flowchart of message acquisition method adapted for the mobile phone of FIG. 1.

FIG. 4 is a flowchart of messages acquisition method adapted for the mobile phone of FIG. 1. In step S310, the action recording module 41 records all sub-actions of the mobile phone 1 in response to input signals from the input unit 20. In step S320, the key phrase acquiring module 42 acquires the key phrase for each sub-action and groups all sub-actions associated with a same key phrase into a same action. In step S330, the counting module 43 counts the number of times of the action in the predetermined time period in the coverage area of the base station. In step S340, the judging module 44 judges whether the number of times of an action reaches the preset value in the predetermined time period in the coverage area of the base station. If yes, in step S350, the signal control module 45 controls the communication unit 10 to send the wireless signal including the key phrase for the action to the base station, if no, the procedure is end. In step S360, the signal control module 45 further receives the message including the key phrase within the text body of the message from the base station and controls the display unit 30 to display the message.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A mobile phone with a function to acquire a targeted message from a base station, comprising:
    an input unit for generating input signals in response to user input;
    a communication unit for sending a wireless signal to the base station and receiving a wireless signal from the base station; and
    a processing unit for recording sub-actions in response to input signals from the input unit in a predetermined time period in a coverage area of the base station, detecting and acquiring a defined key phrase with each sub-action, grouping all sub-actions associated with a same key phrase into a same action, counting the number of times of the action in the predetermined time period in the coverage area of the base station, wherein when the sub-action is performed in the predetermined time period in the coverage area of the base station, the number of times of the action is added one, judging whether the number of times of the action reaches a preset value in the predetermined time period in the coverage area of the base station, when the number of times of an action reaches the preset value in the predetermined time period in the coverage area of the base station, sending a wireless signal including the key phrase for the action to the base station, and receiving a message including the key phrase within the text body of the message from the base station and displaying the message;
    wherein after the mobile phone leaves the coverage area of the base station and when the mobile phone re-enters to the coverage area of the base station, the processing unit is further configured for controlling the communication unit to send the wireless signal including the key phrase for the action performed the number of times equal to or greater than the preset value and receive the message including the key phrase from the base station.

2. A messages acquisition method adapted for a mobile phone from a base station, the method comprising:
    recording sub-actions of the mobile phone in response to input signals from a user in a predetermined time period in a coverage area of the base station;
    detecting and acquiring a defined key phrase with each sub-action;
    grouping all sub-actions associated with a same key phrase into a same action;
    counting the number of times of the action in the predetermined time period in the coverage area of the base station, wherein when the sub-action is performed in the predetermined time period in the coverage area of the base station, the number of times of the action is added one;
    judging whether the number of times of an action reaches a preset value in the predetermined time period in the coverage area of the base station;
    if the number of times of an action reaches the preset value in the predetermined time period in the coverage area of the base station, sending a wireless signal including the key phrase for the action to the base station;
    receiving a message including the key phrase within the text body of the message from the base station and displaying the message; and
    after the mobile phone leaves the coverage area of the base station and when the mobile phone re-enters to the coverage area of the base station, sending the wireless signal including the key phrase for the action performed the number of times equal to or greater than the preset value and receiving the message including the key phrase from the base station.

* * * * *